United States Patent [19]
Kita et al.

[11] Patent Number: 6,143,449
[45] Date of Patent: *Nov. 7, 2000

[54] NON-AQUEOUS SECONDARY CELL

[75] Inventors: Fusaji Kita; Masaharu Higashiguchi, both of Otokuni-gun; Akira Kawakami, Takatsuki, all of Japan

[73] Assignee: Hitachi Maxell, Ltd., Osaka-Fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/508,992

[22] Filed: Jul. 28, 1995

[30] Foreign Application Priority Data

| Jul. 28, 1994 | [JP] | Japan | 6-197309 |
| Oct. 5, 1994 | [JP] | Japan | 6-266262 |
| Jul. 25, 1995 | [JP] | Japan | 7-209971 |

[51] Int. Cl.[7] .................................. H01M 10/40
[52] U.S. Cl. .................. 429/326; 429/231.4; 429/231.6
[58] Field of Search ............................ 429/218, 194, 429/231.4, 231.8, 324, 325, 326

[56] References Cited

U.S. PATENT DOCUMENTS

| 4,853,304 | 8/1989 | Ebner et al. | 429/192 |
| 5,153,082 | 10/1992 | Ogino et al. | |
| 5,326,658 | 7/1994 | Takahashi et al. | 429/218 |
| 5,436,092 | 7/1995 | Ohtsuka et al. | 429/194 |
| 5,451,477 | 9/1995 | Omaru et al. | 429/218 |
| 5,455,127 | 10/1995 | Olsen et al. | 429/194 |
| 5,525,443 | 6/1996 | Okuno et al. | 429/218 |
| 5,541,022 | 7/1996 | Mizumoto et al. | 429/218 |

FOREIGN PATENT DOCUMENTS

| 0529095 | 3/1993 | European Pat. Off. |
| 0563988 | 10/1993 | European Pat. Off. |
| 0567658 | 11/1993 | European Pat. Off. |
| 60-023973 | 6/1985 | Japan |
| 59-134567 | 2/1994 | Japan |

OTHER PUBLICATIONS

G. Pistoia, editor "Lithium Batteries New Materials, Developments . . . ", Elsevier Publishing, p. 159–161. (No month available.), 1994.

Huheey, "Inorganic Chemistry: Principles of Structure and Reactivity", Harper and Row, Publishers, pp. 174–177 (no month), 1972.

Surface Analysis—Applications of IMA, Auger Electron, Photoelectron Spectroscopy, edited by Someno and Yasumori (Mar. 10, 1976).

Shoichiro Mori et al., *Chemical properties of various organic electrolytes for lithium rechargeable batteries*, Journal of Power Sources 68 (1997) 59–64 (no month available).

"Heat Resistance of Polymers" © 1970 Translation of captions of Figs 3.13 & 3.16. (no month available).

Patent Abstracts of Japan, vol. 008, No. 264 (E–282), Dec. 4, 1984 (JP–A–59 123567).

*Primary Examiner*—Carol Chaney
*Attorney, Agent, or Firm*—Birch, Stewart, Kolasch & Birch, LLP

[57] ABSTRACT

A non-aqueous secondary cell having a positive electrode, an electrolytic solution which contains an organic solvent, and a negative electrode which is made of a carbon material having a ratio of $I_O$ to $I_C$ at least 2, where $I_O$ is a peak intensity of oxygen atoms around 530–540 eV and $I_C$ is a peak intensity of carbon atoms around 285 eV in a photoelectron spectrum of an X-ray photoelectron spectroscopy under conditions of 12 kV and 10 mA, which cell has a small retention, a large capacity, and safety against ignition.

7 Claims, 3 Drawing Sheets

NON-AQUEOUS SECONDARY CELL

BACKGROUND OF THE INVENTION

1. Field of the Invention

The present invention relates to a non-aqueous secondary cell containing an electrolytic solution which comprises an organic solvent. More particularly, the present invention relates to a non-aqueous secondary cell which has a small retention, that is, a difference between a charge capacity and a discharge capacity, a large discharge capacity, and safety against fire, etc.

2. Description of the Related Art

A non-aqueous secondary cell, a typical example of which is a lithium secondary cell, has a large discharge capacity and a high energy density and generates a high voltage. Then, its development is highly expected.

Usually, the non-aqueous secondary cell uses an electrolytic solution comprising an organic solvent and a lithium salt dissolved therein, and metal lithium or a lithium alloy as a negative electrode active material. When such negative electrode active material is used, the cell tends to suffer from the formation of an internal short circuit since the metal lithium induces the growth of dendrite or the hard alloy penetrates a separator during charging of the cell, whereby the cell properties are deteriorated, or the safety of the cell is impaired.

To overcome such problems, it has been proposed to use a carbon material such as activated carbon or graphite to or from which lithium ions can be doped or dedoped, as a negative electrode active material instead of the metal lithium or it alloy (see Japanese Patent Publication Nos. 24831/1992 and 17669/1993).

However, the known carbon material has a large retention since the electrolytic solution is decomposed on a surface of the carbon material. To obtain a cell having a large capacity, the decrease of the retention is effective.

In particular, in the case of the recent secondary cell, it is highly desired for the cell to have a high unit volume energy density of 200 wh/l or larger. With such cell, since it is required to make the best use of the active material of the cell, a secondary cell having a smaller retention is desired.

As the organic solvent in the electrolytic solution of the cell, propylene carbonate or 1,2-dimethoxyethane is used. A safer solvent is still sought.

SUMMARY OF THE INVENTION

An object of the present invention is to provide a non-aqueous secondary cell having a smaller retention.

Another object of the present invention is to provide a non-aqueous secondary cell which is safer than the conventional non-aqueous secondary cells.

A further object of the present invention is to provide a method for producing a non-aqueous secondary cell.

According to a first aspect of the present invention, there is provided a non-aqueous secondary cell comprising a positive electrode, an electrolytic solution which comprises an organic solvent, and a negative electrode which is made of a carbon material having a ratio of $I_O$ to $I_C$ of at least 2, preferably not larger than 10, more preferably from 4 to 10, where $I_O$ is a peak intensity of oxygen atoms around 530–540 eV and $I_C$ is a peak intensity of carbon atoms around 285 eV in a photoelectron spectrum of an X-ray photoelectron spectroscopy under conditions of 12 kV and 10 mA.

In one preferred embodiment, carbon dioxide is dissolved in the organic electrolytic solution.

In another preferred embodiment, a triester of phosphoric acid is added to the organic electrolytic solution.

According to a second aspect of the present invention, there is provided a method for producing a non-aqueous secondary cell comprising pouring an electrolytic solution in a cell case in a dry atmosphere comprising carbon dioxide.

DETAILED DESCRIPTION OF THE INVENTION

Figure 1:
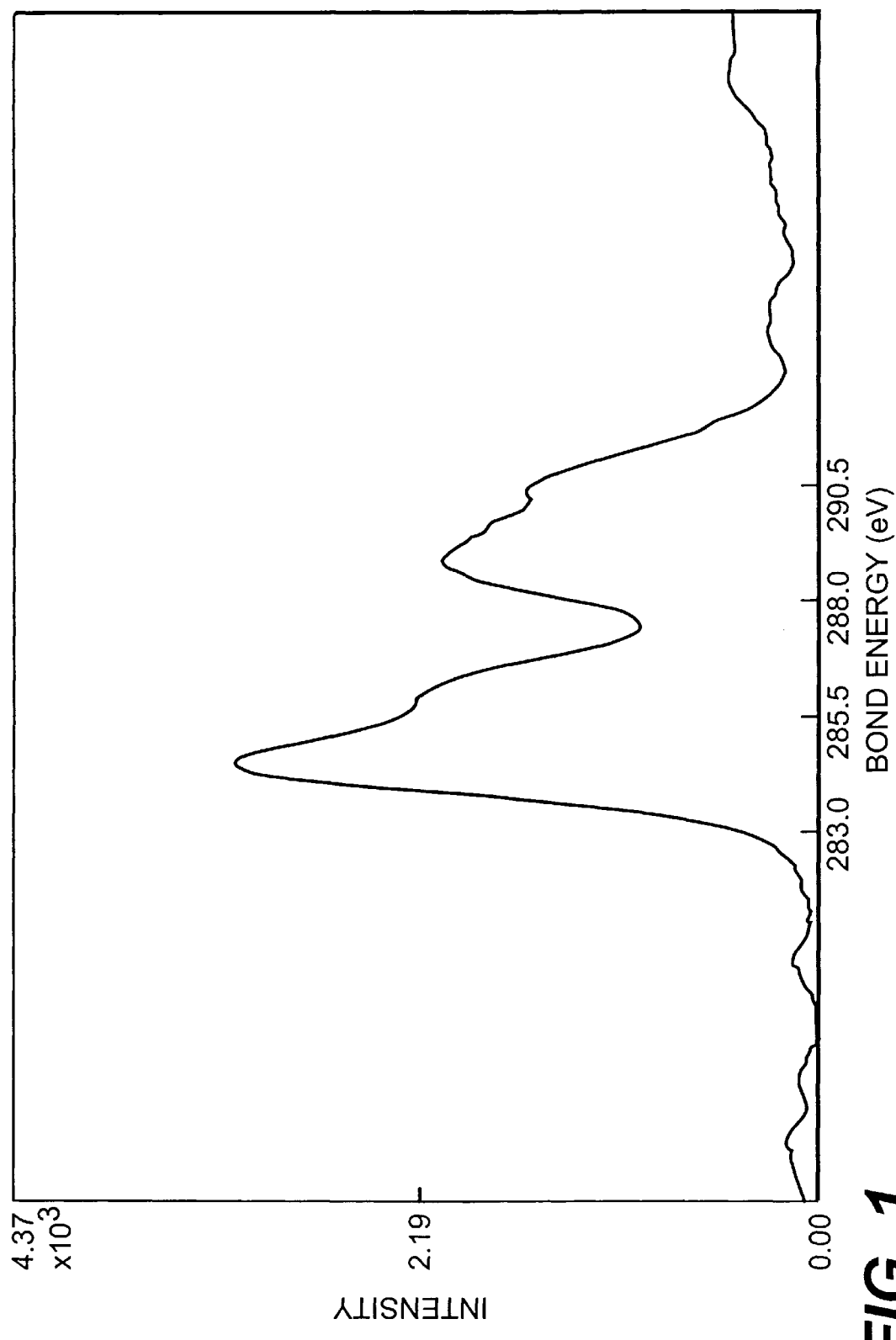
FIGS. 1 and 2 shows intensity peaks in the photoelectron spectrum of the X-ray photoelectron spectroscopy of the carbon material used in Example 1 around 285 eV and 540 eV, respectively.

In the present invention, any carbon material may be used as long as the lithium ion can be doped to or dedoped from it, with the proviso that the negative electrode active material is made of a carbon material having an $I_O/I_C$ ratio of at least 2. Examples of the carbon material to be used in the present invention are pyrolysis carbon, cokes, glass state carbon, calcined materials of organic polymers, mesocarbon microbeads, carbon fibers, activated carbon, and the like.

Preferably, the carbon material usually contains about 0.1 to 10 wt. % of an organic component easily soluble in an organic solvent such as an aromatic or aliphatic compound which comprises a carbon atom and a hydrogen atom, and optionally other atom such as a nitrogen atom or a sulfur atom, and has a low molecular weight of about 400 or less.

In one preferred embodiment, with the negative electrode active material, a spacing of (002) planes ($d_{002}$) measured by X-ray diffraction is preferably at least 3.36 Å, more preferably at least 3.37 Å, most preferably at least 3.38 Å, and does not exceed preferably 3.5 Å, more preferably 3.45 Å, most preferably 3.4 Å, and a size of a crystal in the C axis ($L_c$) is not larger than 50 Å, preferably not larger than 40 Å, more preferably not larger than 35 Å, and is preferably at least 3 Å, more preferably at least 5 Å, most preferably at least 10 Å.

An average particle size of the carbon material is usually from 2 to 30 μm, preferably from 8 to 15 μm, more preferably from 10 to 15 μm, since self-discharge of the cell is large and a cycle life tends to be shortened when the average particle size is smaller than 2 μm.

In the present invention, the negative electrode active material is made of the carbon material having the above defined $I_O/I_C$ ratio of at least 2, preferably not larger than 10, more preferably from 4 to 10.

When the $I_O/I_C$ ratio is less than 2, the retention of the secondary cell is increased.

When the $I_O/I_C$ ratio is 10 or less, the number of the carbon atoms on the surface of the negative electrode increases, so that the amount of the negative electrode active material to or from which the lithium ion can be doped or dedoped, whereby the cell having the high capacity can be obtained.

In particular, to provide the cell having a unit volume energy density of 200 wh/l or larger, it is required to make the best use of the active material. Therefore, the cell having the small retention is more important.

The carbon material having the $I_O/I_C$ ratio of at least 2 can be made from a precursor carbon material having the $I_O/I_C$ ratio of less than 2 by any conventional method. For example, the precursor carbon material is dipped in a treating liquid to dope alkali metal ions to the precursor carbon material, or thermally treated in an atmosphere containing a small amount of lithium and oxygen atoms. Among them, the former dipping method is preferred, since the $I_O/I_C$ ratio becomes more uniform in the surface layer of the negative electrode active material. That is, since the dipping method treats the precursor material with a solution, the surface to be reacted with the solvent is predominantly treated, whereby the cell having the small retention is obtained.

The $I_O/I_C$ ratio on the surface of the carbon material is larger than that in an inside of the negative electrode which appears after being etched by argon sputtering at 2 keV, 7 to 8 $\mu$A for 10 minutes. A ratio of the $I_O/I_C$ ratio in the inside to that on the surface is preferably 0.95:1 or less, more preferably 0.90:1 or less, most preferably 0.70:1 or less. When this ratio is 0.95:1 or less, a surface layer containing the oxygen atoms can be thinly and densely formed and maintained, whereby the retention is made smaller.

To produce the negative electrode active material having the $I_O/I_C$ ratio of not larger than 10 from a precursor material having the $I_O/I_C$ ratio of larger that 10, the precursor material may be thermally treated at a temperature of 300 to 1200° C. with steam, carbon dioxide, inert gas, combustion gas, air, and the like.

A positive electrode used in combination with the negative electrode of the present invention may be any of conventionally used ones. For example, a positive electrode active material or a mixture of the positive electrode material, a conductive aid and a binder (e.g. polytetrafluoroethylene, polyvinylidene fluoride, etc.) is shaped using a collector material (e.g. stainless steel mesh, aluminum foil, etc.) as a core. Examples of the positive electrode active material are metal oxides such as manganese dioxide, vanadium pentoxide, chromium oxide, lithium-cobalt oxide, lithium-nickel oxide, etc., and metal sulfides such as molybdenum disulfide, etc.

Among them, the lithium-cobalt oxide, the lithium-nickel oxide, and the mixture thereof with the above binder are preferred since they can increase the cell capacity.

As an electrolyte in the electrolytic solution, any of conventionally used electrolytes may be used. Examples of the electrolyte are $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($n \geq 2$), and mixtures thereof. Among them, $LiPF_6$ and $LiC_4F_9SO_3$ are preferred, since they have good charge/discharge characteristics. A concentration of the electrolyte in the electrolytic solution is not limited. Preferably, the concentration is from 0.1 to 2 mol/l, more preferably from 0.4 to 1 mol/l.

The electrolytic solution is prepared by dissolving the electrolyte in an organic solvent. As the organic solvent, an ester having a relative dielectric constant of at least 20, a linear ester or an ether having a low viscosity is preferably used to optimize mobility of the lithium ions in the electrolytic solution.

If a solvent has a relative dielectric constant of less than 20, the lithium ion is hardly dissociated in the electrolytic solution, so that the retention tends to increase.

Examples of the ester having the large relative dielectric constant of at least 20 are propylene carbonate (PC), ethylene carbonate (EC), butylene carbonate (BC), γ-butyrolactone (γ-BL), and the like.

Examples of the ether having the low viscosity are 1,2-dimethoxyethane (DME), dioxolane (DO), tetrahydrofuran (THF), 2-methyltetrahydrofuran (2Me-THF), diethyl ether (DEE), and the like.

Examples of the linear ester are diethyl carbonate (DEC), dimethyl carbonate (DMC), and the like.

In addition to the above esters and ethers, imide type organic solvents, sulfur or fluorine-containing solvents, and triesters of phosphoric acid may be used.

In one preferred embodiment, a mixed solvent of a solvent having a large dielectric constant and a solvent having a low viscosity is used. In particular, ethylene carbonate (EC) is preferably used as the solvent having the large dielectric constant.

As the solvent having the low viscosity, a linear ester such as a linear carbonate, or an ether is preferably used. The ether tends to increase the retention when it is used in combination with the carbon material having the $I_O/I_C$ ratio of less than 2. But, when the negative electrode of the present invention is used, such ether can provide the cell having the small retention.

Preferred examples of the ether to be used in the present invention are cyclic ethers, since they will improve the low temperature properties. In particular, dioxolane is preferred.

When carbon dioxide is dissolved in the electrolytic solution of the cell having the above negative electrode of the present invention, the retention of the cell is further improved.

An amount of carbon dioxide to be dissolved in the electrolytic solution is preferably at least 0.03 mol, more preferably at least 0.1 mol, most preferably at least 0.3 mol, per one liter of the electrolytic solution in the cell.

As the amount of the dissolved carbon dioxide increases, the reaction activity of the carbon material is more stably utilized, and the reactivity of the positive electrode active material with the electrolytic solution is more effectively suppressed. However, if the amount of the dissolved carbon dioxide is excessive, carbon dioxide is evaporated from the dielectric solution to increase an internal pressure of the cell and actuate a venting function of the cell. In view of pressure resistance of the cell case or a sealing material of an opening, the dissolved amount of carbon dioxide is preferably 2 mol/l or less.

An amount of carbon dioxide which is charged in the cell case but is not dissolved in the electrolytic solution is included in the dissolved amount, since it will be dissolved in the electrolytic solution when the already dissolved carbon dioxide is consumed, or when the cell is cooled.

Carbon dioxide can be dissolved in the electrolytic solution by any of conventional methods, for example, by bubbling carbon dioxide in the electrolytic solution, or by adding liquefied carbon dioxide to the electrolytic solution. In the bubbling of carbon dioxide, a higher pressure is more preferred. Alternatively, the electrolytic solution and carbon dioxide are charged in a closed pressure vessel and pressurized to dissolve carbon dioxide in the electrolytic solution, or a piece of dry ice is charged in the cell case and then a case opening is closed.

When carbon dioxide is dissolved in the electrolytic solution, a partial pressure of carbon dioxide is preferably at least 0.5 kg/cm$^2$, more preferably at least 1.0 kg/cm$^2$. Since, at a too high partial pressure, the electrolytic solution tends to bubble during pouring, it is preferably 10 kg/cm$^2$ or less.

Preferably, the electrolytic solution containing dissolved carbon dioxide is charged in the cell case in a dry atmosphere comprising carbon dioxide.

Temperatures of the electrolytic solution to be charged or the cell case before the charge of the electrolytic solution are preferably 10° C. or lower, more preferably −20° C. or lower.

When dry ice or liquefied carbon dioxide is used, the above conditions are easily satisfied.

In a preferred embodiment, a piece of dry ice is added in the cell. In this case, the piece of dry ice is not directly added to the electrolytic solution but it is preferably placed on a separator and so on. The cell case opening is preferably closed within one minute, more preferably within 20 seconds, most preferably within 10 seconds from the addition of the piece of dry ice.

To charge the electrolytic solution containing the dissolved carbon dioxide in the cell case, for example, the cell case and the electrolytic solution are cooled to a temperature of −20° C. or lower for several hours, and then the cooled electrolytic solution is charged in the cooled cell case. Alternatively, the cell case is set in a centrifugal separator, and then the electrolytic solution is quickly charged, or the cell case is evacuated and then the electrolytic solution is charged.

The non-aqueous secondary cell of the present invention uses the organic solvent in the electrolytic solution. To avoid the dangers due to the use of the organic solvent when the cell capacity is increased, a triester of phosphoric acid is preferably added to the electrolytic solution.

Herein, the triester of phosphoric acid is a compound of the formula:

$$(RO)_3P=O \qquad (I)$$

wherein R groups are the same or different and each a monovalent organic hydrocarbon group, or two RO groups may form a ring together with the phosphorus atom to which they are bonded.

Examples of the organic hydrocarbon group are a $C_1$–$C_6$ straight or branched alkyl group, a $C_3$–$C_8$ cycloalkyl group, a $C_6$–$C_{10}$ aryl group, a $C_7$–$C_{15}$ aralkyl group, and so on.

Among them, a $C_1$–$C_6$ straight or branched alkyl group is preferred. That is, the preferred triester is a trialkyl ester. Specific examples of the trialkyl ester are trimethyl phosphate, triethyl phosphate, tripropyl phosphate, tributyl phosphate, and the like.

An amount of the triester of phosphoric acid is not limited. A whole volume of the organic solvent may be the triester. In view of the cell properties such as the discharge capacity with maintaining safety against ignition, an amount of the triester of phosphoric acid is preferably at least 40 vol. %, more preferably at least 60 vol. %, most preferably at least 90 vol. % based on the volume of the organic solvent in the organic electrolytic solution.

As an organic solvent to be used in combination with the triester of phosphoric acid, the above described organic solvent for the electrolytic solution may be used. Since most of the esters having the high dielectric constant are flammable, their amount is preferably small. That is, an amount of the ester having the high dielectric constant is 10 vol. % or less, more preferably 5 vol. % or less, most preferably 3 vol. % or less of the whole volume of the solvent in the electrolytic solution.

The increase of the discharge capacity by the ester having the high dielectric constant appears when the amount of the ester is 1 vol. % or larger of the solvent in the electrolytic solution, and the increase of the discharge capacity is remarkable when the amount of the ester reaches 2 vol. %. Accordingly, the amount of the ester having the high dielectric constant is preferably from 1 to 10 vol. %, more preferably from 2 to 5 vol. %, in particular from 2 to 3 vol. % of the whole volume of the organic solvent in the electrolytic solution.

A difference of a boiling point between the triester of phosphoric acid and the ester is preferably 150° C. or less, more preferably 100° C. or less, most preferably 50° C. or less, in particular 10° C. or less, since the ester is less ignited when the combustible ester and the flame retardant triester of phosphoric acid form an azeotropic mixture.

When the carbon material is used as the negative electrode material and the triester of phosphoric acid is used as a solvent in the electrolytic solution, the effect of the dissolution of carbon dioxide in the electrolytic solution is more significant. This is because, when the secondary cell is assembled using the carbon material having the $I_O/I_C$ ratio of less than 2 as the negative electrode material and the high voltage active material is used as the positive electrode material, the electrolytic solution comprising the triester of phosphoric acid induces the reaction on the surface of the negative electrode to decrease the discharge performance of the cell greatly. When carbon dioxide is dissolved in the electrolytic solution, the reaction between the carbon material of the negative electrode and the organic solvent of the electrolytic solution is suppressed.

EXAMPLES

The present invention will be illustrated by the following examples, which will not limit the scope of the present invention in any way.

Example 1

As a negative electrode active material, there was used a carbon material which had the $I_O/I_C$ ratio of 5.4 on its surface when measured by XPS analysis at 12 kV, 10 mA and the $I_O/I_C$ ratio of 5.1 after the material was etched by argon sputtering at 2 keV, 7–8 µA for 10 minutes. That is, a ratio of the $I_O/I_C$ ratio in the inside to that on the surface was 0.98:1.

Figure 2:
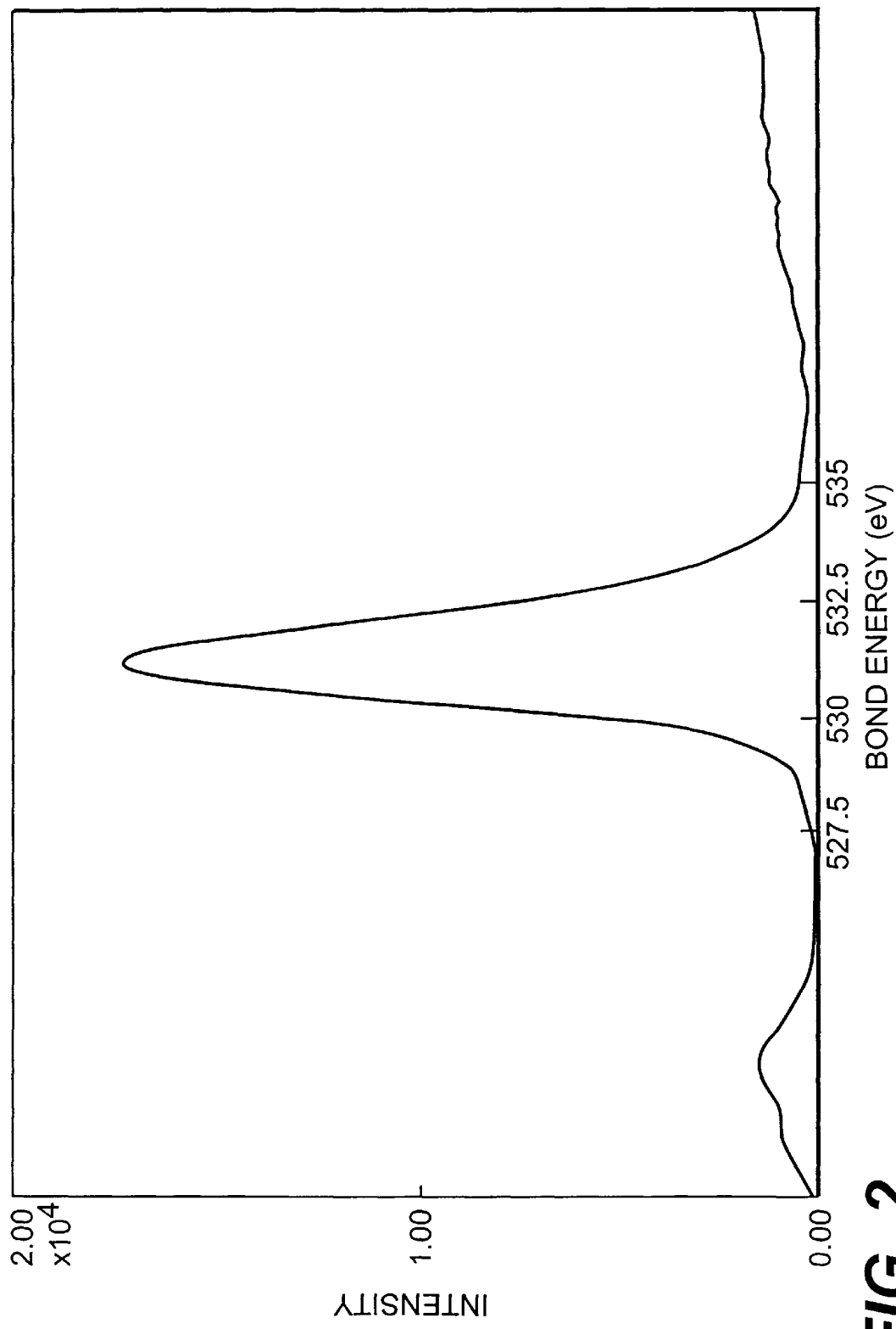

The XPS analysis was carried out, and the peak intensities around 530–540 eV and 285 eV in the obtained spectrum were compared. These peaks are shown in FIGS. 1 and 2.

This negative electrode active material had a d-spacing of (002) planes by the X-ray diffraction ($d_{002}$) of 3.39 Å, the crystal size in the C axis direction $L_c$ of 31 Å, an average particle size of 12 µm.

The above negative electrode active material was mixed with a mass of vinylidene fluoride as a binder in a weight ratio of 9:1 (active material/binder) to obtain a negative electrode mixture. Then, this mixture was dispersed in N-methylpyrrolidone to form a slurry. The slurry was uniformly coated on a negative electrode collector made of a band-form copper foil having a thickness of 18 µm and dried, pressed by a roller press, and cut to a determined size, followed by welding of a lead wire, to obtain a band-form electrode.

Using the above produced negative electrode and a below explained positive electrode, a secondary cell was assembled.

$LiCoO_2$ (91 wt. parts), graphite (6 wt. parts) and polyvinylidene fluoride (3 wt. parts) were mixed and dispersed in N-methylpyrrolidone to obtain a slurry. This slurry of the positive electrode mixture was uniformly coated on both surfaces of a positive electrode collector made of an aluminum foil having a thickness of 20 µm and dried, and pressed by a roller press, followed by welding of a lead wire, to obtain a band-form positive electrode.

Figure 3:
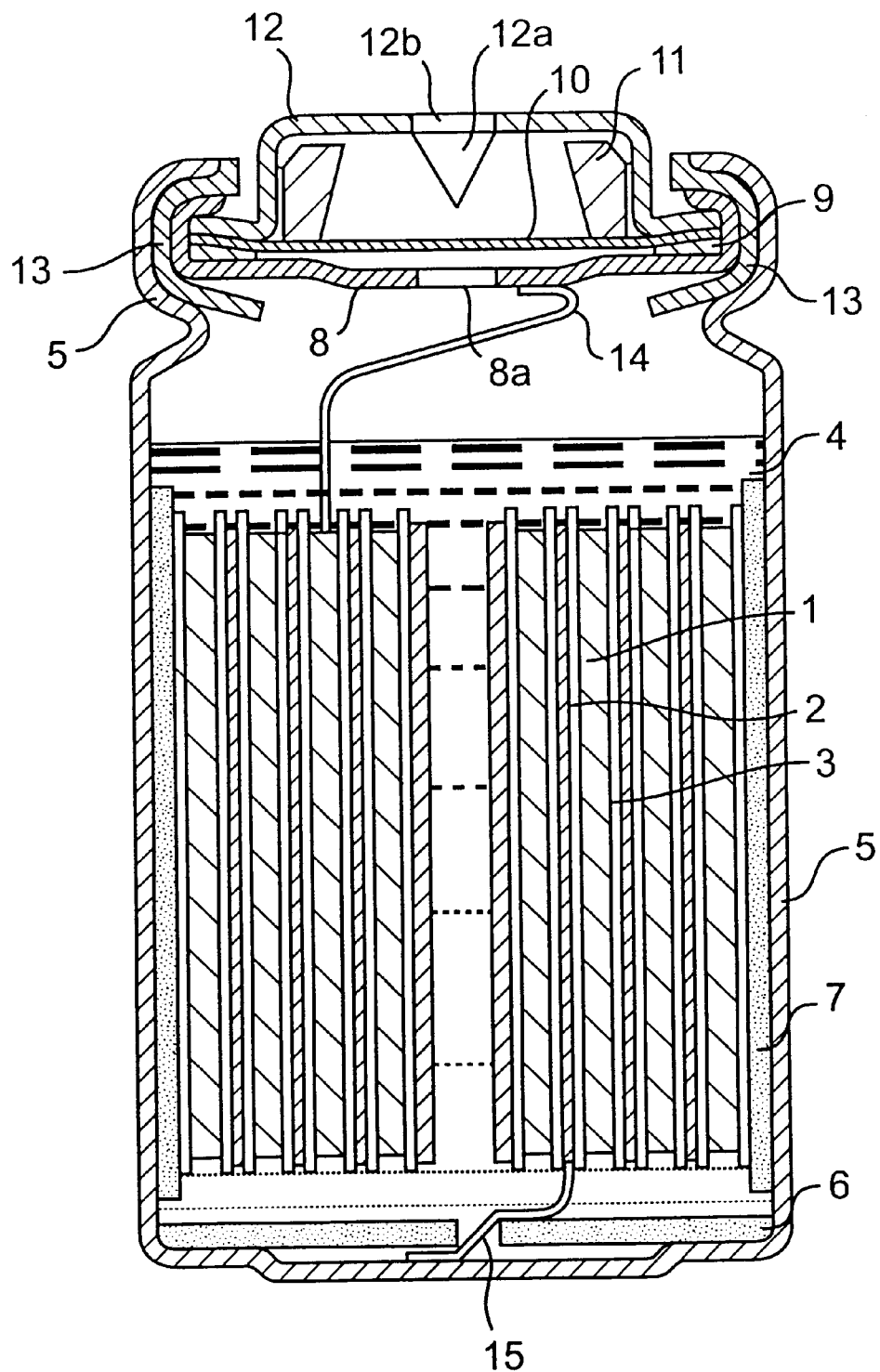
FIG. 3 is a schematic cross section of a secondary cell according to the present invention.

The band-form positive electrode was laminated on the band-form negative electrode with inserting a microporous polypropylene film having a thickness of 25 μm between them, and the laminated electrodes were wound to form a spirally wound electrode body, and inserted in a cylindrical cell case having a bottom and an outer diameter of 15 mm. After welding the lead wires of the positive and negative electrodes to the cell case, an electrolytic solution comprising 0.5 mol/l of $LiC_4F_9SO_3$ in a mixed solvent of ethylene carbonate (EC) and dioxane (DO) in a volume ratio of 1:1 was poured in the cell case A cross section of the cell to be assembled is schematically shown in FIG. 3.

The cell comprises a positive electrode 1, a negative electrode 2, a separator 3, an electrolytic solution 4, and a cell case 5. To simplify the drawing, the collectors of the positive and negative electrodes are not shown in FIG. 3.

The cell case can be made of any material that is conventionally used as a cell case material, such as stainless steel. The cell case 5 also functions as a negative electrode terminal. An insulator 6 made of, for example, a polytetrafluoroethylene sheet is placed on the bottom of the cell case 5, and another insulator 7 made of, for example, a polytetrafluoroethylene sheet is placed on an inner wall of the cell case 5. The spirally wound electrode body consisting of the positive electrode 1, the negative electrode 2 and the separator 3, and electrolytic solution 4 are contained in the cell case 5.

An opening of the cell case 5 is closed by a sealing plate 8, which has a gas vent hole 8a at its center. The sealing plate 8 has an annular packing 9 made of, for example, polypropylene, a flexible thin plate 10 made of, for example, titanium, and a heat deformable annular member 11 made of, for example, polypropylene. When the heat deformable annular member 11 is deformed by the increase of a temperature, it changes a destruction pressure of the flexible thin plate 10.

The cell has a terminal plate 12 made of, for example, a nickel plated milled steel plate. The terminal plate 12 has a cutting blade 12a and a gas vent hole 12b. If an internal pressure of the cell increases due to the generation of a gas in the cell and the flexible thin plate 10 is deformed by the pressure increase, the cutting blade 12a breaks the flexible thin plate 10, whereby the gas is exhausted from the cell interior to outside through the vent hole 12b. Thereby, the breakage of the cell is prevented.

Around the sealing plate 8, an insulating packing 13 is provided. A lead wire 14 electrically connects the positive electrode 1 and the sealing plate 8, and the terminal plate 12 functions as a positive electrode terminal when it is contacted to the sealing plate 12. A lead wire 15 electrically connects the negative electrode 2 and the cell case 5.

Example 2

In the same manner as in Example 1 except that, as a negative electrode active material, there was used a carbon material which had the $I_O/I_C$ ratio of 2.2 on its surface when measured by XPS analysis at 12 kV, 10 mA, the $I_O/I_C$ ratio of 2.1 after the material was etched by argon sputtering at 2 keV, 7–8 μA for 10 minutes, and a ratio of the $I_O/I_C$ ratio in the inside to that on the surface was 0.95:1, a secondary cell was produced.

Example 3

In the same manner as in Example 1 except that, as a negative electrode active material precursor, there was used a carbon material which had the $I_O/I_C$ ratio of 1.75 on its surface when measured in the same manner as in Example 1, a d-spacing of the (002) planes ($d_{002}$) of 3.44 Å when measured by the X-ray diffraction, a crystal size in the C axis $L_c$ of 28 Å, an average particle size of 11 μm, an electrode body was prepared.

Separately, a liquid for treating the carbon material was prepared by dissolving $LiC_4F_9SO_3$ (NFB) in dioxolane (DO) and adding ethylene carbonate (EC) to obtain a solution of 0.5 mol/l of NFB in a mixed solvent of EC and DO (volume ratio of 1:1).

The electrode body was doped with lithium in this treating liquid for 48 hours by forming a short circuit with a lithium plate as a counter electrode, and then dedoped by applying a voltage of 1.5 V for 3 days, followed by washing with dioxolane to obtain the intended electrode.

The obtained carbon material as the negative electrode active material was analyzed by the XPS to find that the $I_O/I_C$ ratio on its surface was 6.2 when measured by XPS analysis at 12 kV, 10 mA, the $I_O/I_C$ ratio after the material was etched by argon sputtering at 2 keV, 7–8 μA for 10 minutes was 4.2, and a ratio of the $I_O/I_C$ ratio in the inside to that on the surface was 0.68:1.

In the same manner as in Example 1 except that this negative electrode was used, a secondary cell was produced.

Example 4

In the same manner as in Example 1 except that, as a negative electrode active material precursor, there was used a carbon material having the $I_O/I_C$ ratio of 12.8 on its surface when measured by the same method as in Example 1, a crystal size in the C axis direction $L_c$ of 35 Å, an average particle size of 11 μm, an electrode body was prepared.

Then, this electrode body was heat treated in an inert gas (argon) atmosphere containing 10 vol. % of carbon dioxide at 900° C. for 5 hours to obtain the electrode body in which the $I_O/I_C$ ratio of the negative electrode active material was 9.1. The $I_O/I_C$ ratio after the material was etched by argon sputtering at 2 keV, 7–8 μA for 10 minutes was 8.8, and a ratio of the $I_O/I_C$ ratio in the inside to that on the surface was 0.98:1.

In the same manner as in Example 1 except that this negative electrode was used, a secondary cell was produced.

Example 5

In the same manner as in Example 1 except that carbon dioxide was bubbled in the electrolytic solution to dissolve it in the solution at a partial pressure of 1 kg/cm², an electrolytic solution was prepared.

The same elements as those used in Example 1 were set in the cell case. Then, the cell case and the electrolytic solution were cooled by dry ice to a temperature of −20 to −40° C. While maintaining the carbon dioxide atmosphere, the cooled electrolytic solution was poured in the cell case. After the electrolytic solution was thoroughly permeated in the elements in the cell case, about 0.02 g of dry ice was set without being wetted by the electrolytic solution, and the case opening was sealed within 5 seconds to produce the cell.

When an amount of carbon dioxide in the electrolytic solution was measured, it was about 0.35 mol/l based on the electrolytic solution.

Example 6

Trimethyl phosphate (TMP) and ethylene carbonate (EC) were mixed in a volume ratio of 98:2. In this mixed solvent, LiC$_4$F$_9$SO$_3$ was dissolved in a concentration of 1.0 ml/l to obtain a treating liquid having a composition of 1.0 mol/l of NFB in the mixed solvent of TMP and EC (volume ratio of 98:2).

In the same manner as in Example 3 except that this treating liquid was used, a negative electrode active material precursor as used in Example 3 was treated to obtain an intended electrode.

The obtained carbon material as the negative electrode active material was analyzed by the XPS to find that the I$_O$/I$_C$ ratio on its surface was 9.2 when measured by XPS analysis at 12 kV, 10 mA, the I$_O$/I$_C$ ratio after the material was etched by argon sputtering at 2 keV, 7–8 μA for 10 minutes was 6.4, and a ratio of the I$_O$/I$_C$ ratio in the inside to that on the surface was 0.69:1.

In the same manner as in Example 1 except that this negative electrode was used and carbon dioxide was bubbled in the electrolytic solution to dissolve it in the solution at a partial pressure of 1 kg/cm$^2$, a secondary cell was produced.

A concentration of carbon dioxide in the electrolytic solution in the cell was measured to find to be about 0.35 mol/l.

Comparative Example 1

In the same manner as in Example 1 except that, as a negative electrode active material, there was used a carbon material which had the I$_O$/I$_C$ ratio of 1.5 on its surface when measured in the same manner as in Example 1, the I$_O$/I$_C$ ratio of 1.0 after the material was etched by argon sputtering at 2 keV, 7–8 μA for 10 minutes, a ratio of the I$_O$/I$_C$ ratio in the inside to that on the surface of 1.0:1, a d-spacing of the (002) planes (d$_{002}$) of 3.38 Å when measured by the X-ray diffraction, a crystal size in the C axis L$_c$ of 32 Å, an average particle size of 12 μm, a secondary cell was produced.

Comparative Example 2

In the same manner as in Example 1 except that, as a negative electrode active material, there was used a carbon material which had the I$_O$/I$_C$ ratio of 11.0 on its surface when measured in the same manner as in Example 1, the I$_O$/I$_C$ ratio of 10.5 after the material was etched by argon sputtering at 2 keV, a ratio of the I$_O$/I$_C$ ratio in the inside to that on the surface of 0.95:1, 7–8 μA for 10 minutes, a d-spacing of the (002) planes (d$_{002}$) of 3.38 Å when measured by the X-ray diffraction, a crystal size in the C axis L$_c$ of 32 Å, an average particle size of 12 μm, a secondary cell was produced.

Each of the cells produced in Examples 1–6 and Comparative Examples 1 and 2 was charged and discharged at 0.1 C at a voltage of 2.7–4.2 V, and a retention after the first cycle was measured. The retention was calculated according to the following equation:

Retention (%)=[(charge capacity−discharge capacity)/(charge capacity)]×100

A capacity of each cell was measured and expressed with that of the cell of Example 1 being "10".

The results are shown in Table 1.

TABLE 1

| Example | Retention (%) | Relative capacity | I$_O$/I$_C$ on surface | I$_O$/I$_C$ inside |
|---|---|---|---|---|
| 1 | 7 | 100 | 5.2 | 5.1 |
| 2 | 15 | 95 | 2.2 | 2.1 |
| 3 | 2 | 125 | 6.2 | 4.2 |
| 4 | 6 | 93 | 9.1 | 8.8 |
| 5 | 5 | 109 | 5.7 | 5.1 |
| 6 | 2 | 92 | 9.2 | 6.4 |
| C. 1 | 28 | 90 | 1.5 | 1.5 |
| C. 2 | 25 | 32 | 11.0 | 10.5 |

Conditions in the XPS Analysis:
Apparatus: SCALAB mark 2
Condition: 12 kV-10 mA
Pressure: 7×10$^{-7}$ Pa
No Argon sputtering.
(An intensity where no peak was found was "0", and using this intensity as a base line, the intensities were normalized. See FIGS. 1 and 2.)

As seen from the results in Table 1, the cells of Examples 1–6 had very small retention in comparison with the cells of Comparative Examples 1 and 2. The cell of Example 5 in which carbon dioxide was dissolved in the electrolytic solution had a good retention and an excellent relative capacity in comparison with the cell of Example 1 in which no carbon dioxide was dissolved in the electrolytic solution.

Example 7

In trimethyl phosphate (TMP), LiC$_4$F$_9$SO$_3$ (NFB) was dissolved at a concentration of 1.0 mol/l to obtain an electrolytic solution having a composition of 1.0 mol/l of NFB in TMP.

In the electrolytic solution, carbon dioxide was bubbled to dissolve carbon dioxide in the electrolytic solution.

In the same manner as in Example 5, a concentration of carbon dioxide in the electrolytic solution in the cell was measured to find to be about 0.35 mol/l.

Separately, LiNiO$_2$ as positive electrode active material and flake graphite as a conductive aid were mixed in a weight ratio of 100:33. Then, the mixture was mixed with a solution of polyvinylidene fluorine (12 wt. parts) in N-methylpyrrolidone (88 wt. parts) to obtain a slurry. After the slurry of the positive electrode material mixture was filtrated through a 70 mesh net to remove large particles, it was coated on both surfaces of a positive electrode collector made of an aluminum foil having a thickness of 20 μm and dried, and pressed by a roller press, followed by cutting to obtain a band form positive electrode, to which a lead wire was welded.

In the same manner as in Example 1 except that the above electrolytic solution and the above positive electrode were used, a secondary cell was produced.

Example 8

In the same manner as in Example 7 except that, as an electrolytic solution, there was used a 1.0 mol/l solution of LiC$_4$F$_9$SO$_3$ in a mixed solvent of 98 vol. % of trimethyl phosphate and 2 vol. % of ethylene carbonate, a concentration of carbon dioxide dissolved in an electrolytic solution was changed to 0.1 mol/l, and no piece of dry ice was added, a secondary cell was produced.

Example 9

In a mixed solvent of triethyl phosphate (TEP) and ethylene carbonate (EC) in a volume ratio of 98:2, $LiC_4F_9SO_3$ (NFB) was dissolved at a concentration of 1.0 mol/l to obtain an electrolytic solution having a composition of 1.0 mol/l of NFB in TMP (98 vol. %)/EC (2 vol. %).

In the electrolytic solution, carbon dioxide was bubbled to dissolve carbon dioxide in the electrolytic solution.

A concentration of carbon dioxide in the electrolytic solution in the cell was measured to find to be about 0.35 mol/l.

In the same manner as in Example 7 except that the above electrolytic solution was used, a secondary cell was produced.

Comparative Example 3

In a mixed solvent of 1,2-dimethoxyethane and ethylene carbonate in a volume ratio of 1:1, $LiC_4F_9SO_3$ was dissolved in a concentration of 1.0 mol/l to prepare an electrolytic solution.

In the same manner as in Example 7 except that the above electrolytic solution was used without dissolving carbon dioxide therein, a secondary cell was produced.

Safety Test

For simulating a situation that a safety valve was actuated (that is, in the cell of FIG. 3, a gas was generated by, for example, evaporation of the solvent from the electrolytic solution and, in turn, an internal pressure of the cell increased to inflate the flexible thin plate 10 towards the terminal plate 12 till it contacted to the cutting blade 12a, whereby the plate 10 was broken, and the interior gas was exhausted through the gas vent hole 12b), the flexible thin plate was intentionally broken, and the cell was heated up to 100° C. Than, a fire was brought close to the gas vent hole 12b, ether or not the gas was ignited was checked. The results are in Table 2.

TABLE 2

| Example No. | Alkyl groups of triester of phosphoric acid | Ignition |
| --- | --- | --- |
| 6 | Methyl | No |
| 7 | Methyl | No |
| 8 | Methyl | No |
| 9 | Ethyl | No |
| Comp. 3 | None | Ignited when heated to about 40° C. |

As seen from the results in Table 2, the cells of Examples 6–9 were not ignited when heated up to 100° C., and had high safety against fire. The electrolytic solutions used in the cells of Examples had flash points of higher than 200° C.

What is claimed is:

1. A non-aqueous secondary cell comprising:

a positive electrode, an electrolytic solution which comprises an organic solvent, and a negative electrode which is made of a carbon material having a ratio of $I_O$ to $I_C$ of at least 2, where $I_O$ is a peak intensity of oxygen atoms around 530–540 eV and $I_C$ is a peak intensity of carbon atoms around 285 eV in a spectra obtained by X-ray photoelectron spectroscopy at room temperature under conditions of 12 kV and 10 mA, and said electrolytic solution contains carbon dioxide dissolved therein.

2. The non-aqueous secondary cell according to claim 1, wherein the amount of dissolved carbon dioxide is at least 0.03 mol/l.

3. The non-aqueous secondary cell according to claim 1, wherein said ratio of $I_o$ to $I_c$ is between 2 and 10.

4. The non-aqueous secondary cell according to claim 1, wherein said ration of $I_o$ to $I_c$ is between 4 and 10.

5. A non-aqueous secondary cell comprising:

a positive electrode, an electrolytic solution which comprises an organic solvent, and a negative electrode which is made of a carbon material having a ratio of $I_o$ to $I_c$ of at least 2, where $I_o$ is a peak intensity of oxygen atoms around 530–540 eV and $I_c$ is a peak intensity of carbon atoms around 285 eV in a spectra obtained by X-ray photoelectron spectroscopy at room temperature under conditions of 12 kV and 10 mA, and said electrolytic solution comprises a triester of phosphoric acid.

6. The non-aqueous secondary cell according to claim 5, wherein said triester of phosphoric acid is a compound of the formula:

$$(RO)_3P=O \qquad (I)$$

wherein R groups are the same or different and each a $C_1$–$C_6$ alkyl group, or two RO groups may form a ring together with the phosphorus atom to which they are bonded.

7. A non-aqueous secondary cell comprising a positive electrode, an electrolytic solution which comprises an organic solvent comprising a triester of phosphoric acid and containing carbon dioxide dissolved therein, and a negative electrode which is made of a carbon material having a ratio of $I_o$ to $I_c$ of at least 2, where $I_o$ is a peak intensity of oxygen atoms around 530–540 eV and $I_c$ is a peak intensity of carbon atoms around 285 eV in a spectra obtained by X-ray photoelectron spectroscopy under conditions of 12 kV and 10 mA.

\* \* \* \* \*